US006826704B1

(12) United States Patent
Pickett

(10) Patent No.: US 6,826,704 B1
(45) Date of Patent: Nov. 30, 2004

(54) MICROPROCESSOR EMPLOYING A PERFORMANCE THROTTLING MECHANISM FOR POWER MANAGEMENT

(75) Inventor: James K. Pickett, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 682 days.

(21) Appl. No.: 09/802,782

(22) Filed: Mar. 8, 2001

(51) Int. Cl.⁷ .............................. G06F 1/26; G06F 1/30
(52) U.S. Cl. ...................................... 713/320; 713/324
(58) Field of Search ................................. 713/310, 324, 713/300, 320; 712/217, 22, 215

(56) References Cited

U.S. PATENT DOCUMENTS

| | | | |
|---|---|---|---|
| 5,490,059 A | | 2/1996 | Mahalingaiah et al. |
| 5,491,829 A | * | 2/1996 | Kau et al. ..................... 712/23 |
| 5,539,681 A | * | 7/1996 | Alexander et al. .......... 713/321 |
| 5,742,832 A | | 4/1998 | Buxton et al. |
| 5,764,524 A | | 6/1998 | Andersson et al. |
| 5,805,907 A | * | 9/1998 | Loper et al. ................. 713/300 |
| 5,887,178 A | | 3/1999 | Tsujimoto et al. |
| 5,951,689 A | | 9/1999 | Evoy et al. |
| 6,029,006 A | | 2/2000 | Alexander et al. |
| 6,081,901 A | | 6/2000 | Dewa et al. |
| 6,138,232 A | | 10/2000 | Shiell et al. |
| 6,182,203 B1 | * | 1/2001 | Simar et al. ................... 712/22 |
| 6,237,101 B1 | * | 5/2001 | Moore et al. ................ 713/320 |
| 6,308,260 B1 | * | 10/2001 | Le et al. ....................... 712/215 |
| 6,430,678 B1 | * | 8/2002 | Kahle et al. ................. 712/217 |
| 6,553,502 B1 | * | 4/2003 | Hurd et al. .................. 713/320 |
| 2003/0079150 A1 | * | 4/2003 | Smith et al. ................. 713/320 |

OTHER PUBLICATIONS

IEEE article 'Instruction Flow–Based Front–end Throttling for Power–Aware High–Performance Processors' by Amirali Baniasadi, and Andreas Moshovos Aug. 6–7, 2001.*

* cited by examiner

Primary Examiner—Thomas Lee
Assistant Examiner—Chun Cao
(74) Attorney, Agent, or Firm—Meyertons Hood Kivlin Kowert & Goetzel, P.C.; B. Noël Kivlin

(57) ABSTRACT

A microprocessor includes a plurality of execution units each configured to execute instructions and an instruction dispatch circuit configured to dispatch instructions for execution by the plurality of execution units. A power management control unit includes a programmable unit for storing information specifying one or more reduced power modes. In the implementation of a first performance throttling technique, the power management control unit may be configured to cause the instruction dispatcher to limit the dispatch of instructions to a limited number of execution units. In the implementation of a second performance throttling technique, the power management control unit may be configured to limit the dispatch of instructions from the instruction dispatcher on every cycle, upon every other cycle, upon every third cycle, upon every fourth cycle, and so on. In the implementation of a third performance throttling technique, the power management control unit may be configured to control the dispatch of instructions from a floating-point scheduler to one or more floating-point execution pipelines.

14 Claims, 4 Drawing Sheets

MICROPROCESSOR EMPLOYING A PERFORMANCE THROTTLING MECHANISM FOR POWER MANAGEMENT

BACKGROUND OF THE INVENTION

1. Field of the Invention

This invention relates to microprocessors and more particularly to the management of power consumption within microprocessors.

2. Description of the Related Art

Various techniques have been devised for reducing the power consumption of computer systems. These techniques include increasing the integration of circuitry and incorporation of improved circuitry and power management units (PMUs). One specific power reduction technique employed with computer systems generally involves the capability of stopping clock signals that drive inactive circuit portions. A system employing such a technique typically includes a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves the capability of reducing the frequency of clock signals that drive circuit portions during operating modes which are not time critical, and another technique involves the capability of removing power from inactive circuit portions.

Controlling and reducing power consumed by the microprocessors of computer systems has likewise been important. Power consumption has in part been impacted as a result of the ever-increasing amounts of logic incorporated within microprocessor chips and increasing frequencies of operation.

In many computer systems and applications that employ microprocessors, attaining high performance is also critical. To achieve high performance, many microprocessors employ complex micro-architectural features including, for example, superscalar and/or out-of-order execution techniques and other relatively complex structures. Implementation of such microprocessors often requires relatively large amounts of circuitry which thus contributes to power consumption issues. Accordingly, often compromises are made in microprocessor designs to attain acceptable power consumption characteristics while providing relatively high performance.

SUMMARY

The problems outlined above may in large part solved by a microprocessor employing a performance throttling mechanism for power management as described herein. In one embodiment, a microprocessor includes a plurality of execution units each configured to execute instructions and an instruction dispatch circuit configured to dispatch instructions for execution by the plurality of execution units. A power management control unit includes a programmable unit for storing information specifying one or more reduced power modes.

In the implementation of a first performance throttling technique, the power management control unit may be configured to cause the instruction dispatcher to limit the dispatch of instructions to a limited number of execution units. Rather than dispatching instructions at a normal maximum dispatch rate, the instruction dispatcher may dispatch instructions at a rate of only, for example, two instructions per cycle or at a rate of only one instruction per cycle, depending information stored in the power management control unit. Thus, when operating in this mode, a reduced number of the execution units will be active in the execution of newly dispatched instructions. This may thereby reduce overall power consumption.

In the implementation of a second performance throttling technique, the power management control unit may be configured to limit the dispatch of instructions from the instruction dispatcher on every cycle, upon every other cycle, upon every third cycle, upon every fourth cycle, and so on. In one particular implementation, a counter (or counters) may be set to control the stalling of instruction dispatch.

In the implementation of a third performance throttling technique, the power management control unit may be configured to control the dispatch of instructions from a floating-point scheduler to one or more floating-point execution pipelines. Valid instructions may be provided to the floating-point execution pipeline(s) on every cycle, every other cycle, every third cycle, every fourth cycle, and so on, to achieve desired power conservation.

In yet additional embodiments, the power management control unit may alternatively or additionally throttle the performance of other processors sub-units to reduce power on either a maximum power or average power basis. For example, in one embodiment, the power management control unit may be configured to cause an instruction cache and/or data cache of the microprocessor to process requests only on every other cycle, every third cycle, and so on.

BRIEF DESCRIPTION OF THE DRAWINGS

Other objects and advantages of the invention will become apparent upon reading the following detailed description and upon reference to the accompanying drawings in which.

Figure 1:
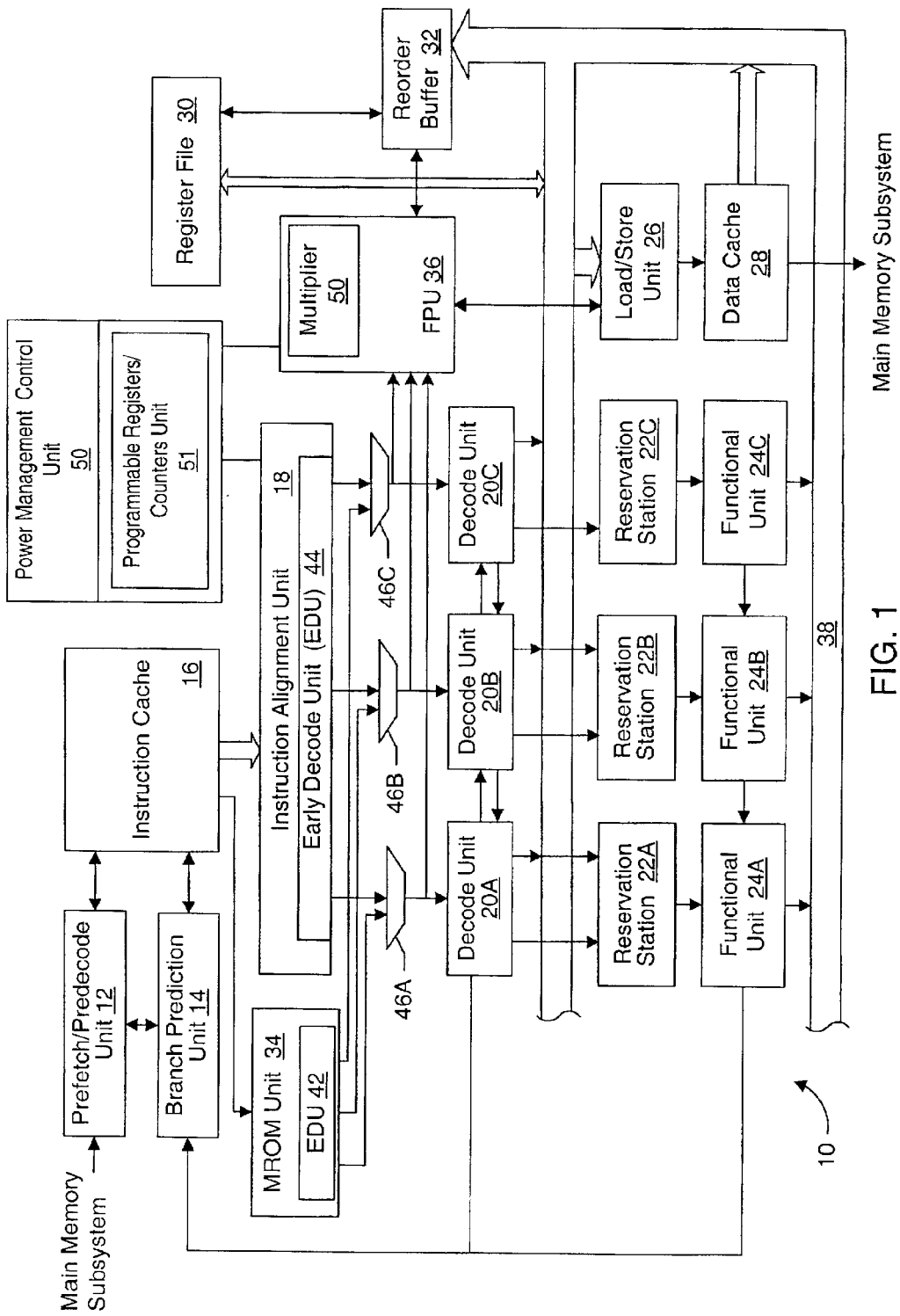
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, and a plurality of functional units 24A–24C. Microprocessor 10 further includes a load/store unit 26, a data cache 28, a register file 30, a reorder buffer 32, an MROM unit 34, a floating-point unit (FPU) 36 and a power management control unit 50. Elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16, decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42, is coupled to decode units 20 and FPU 36. FPU 36 is coupled to load/store unit 26 and reorder buffer 32. Power management control unit 50, which illustratively includes a programmable registers/counters unit 51, is finally shown coupled to instruction alignment unit 18 and FPU 36.

As will be described in further detail below, power management control unit 50 is provided to throttle the performance of microprocessor 10 by limiting dispatch (or issue) rates associated with the microprocessor 10 to thereby reduce the dynamic power consumption of the part without having to reduce frequency. Prior to discussing details relating to power control unit 50 and the throttling of performance within microprocessor 10, aspects relating to the operation of the components of microprocessor 10 will first be discussed. Details regarding the general operation of one implementation of power management control unit 50 will be provided further below in conjunction with FIG. 3.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (x86 floating-point, MMX, and 3DX instructions). In one embodiment of microprocessor 10, up to three floating-point instructions per clock cycle may be conveyed to floating-point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not retired prior to the exception). Stated another way, while some instructions following the exception-causing instruction may have been executed before the exception, their results have not been committed to the microprocessor's architectural state. It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26. In one particular embodiment, each functional unit 24 may comprise an execution unit and an independent address generation unit. Such functional units may perform an address generation for conveyance to load/store unit 26 in parallel with the execution of an integer or branch operation.

Each of the functional units 24 may also provide information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a pre-cache load/store buffer having twelve storage locations for data and address information for pending loads or stores and a post-cache load/store buffer having 32 entries. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

Data cache 28 is a high speed cache memory provided to temporarily store data being transferred between load/store unit 26 and the main memory subsystem. In one embodiment, data cache 28 has a capacity of storing up to sixty-four kilobytes of data in a two way set associative structure. It is understood that data cache 28 may be implemented in a variety of specific memory configurations, including a set associative configuration.

Figure 2:
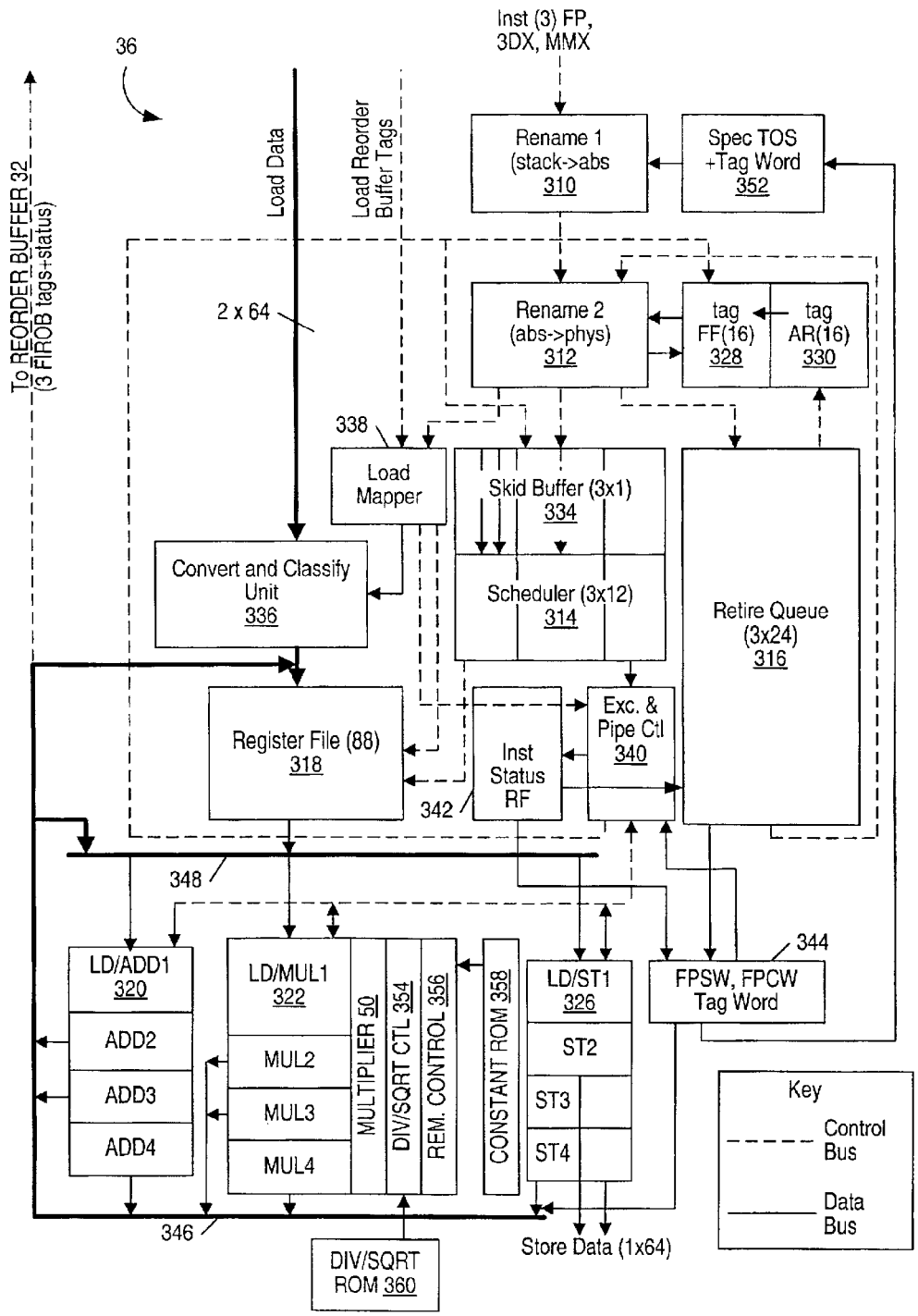
FIG. 2 is a block diagram of one embodiment of a floating-point unit within the microprocessor of FIG. 1.

Turning now to FIG. 2, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating-point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add execution pipeline 320, a load/multiply execution pipeline 322, a load/store execution pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipeline control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to execution pipelines 320, 322, and 326. Finally, execution pipelines 320, 322, and 326, and floating-point status/control/tag words 344 are all coupled to result bus 346. While floating-point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipeline control unit 340, or retire queue 316.

Rename-1 unit 310 receives up to three instructions per clock cycle. As previously noted, these may be any combination of floating-point, MMX, or 3DX instructions. Rename-1 unit 310 converts stack-relative registers into absolute register numbers. For instructions with memory operands, e.g., FLD instructions (floating-point load), a stack-relative reference (e.g., the destination ST(7)) is mapped to an absolute register number. Furthermore, in some embodiments load-execute instructions such as FADD [mem] also need to source operands converted from top-of-stack relative addressing to absolute addressing. Thus, in some embodiments x87 type instructions (i.e., floating point instructions) go through the stack to absolute register translation process, while MMX and 3DNow! instructions do not. The x86 instruction set and architecture defines eight floating-point registers that are accessed in a stack-like manner (i.e., relative to a top-of-stack pointer). Rename-1 unit 310 also assigns each instruction to one of three execution pipelines, either load/store execution pipeline 326, load/add execution pipeline 320, or load/multiply execution pipeline 322 and, if necessary, converts each instruction to an internal format.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. It is noted that, of the sixteen registers that define FPU 36's state (architectural or speculative), eight are architectural registers (i.e., floating-point stack or MMX registers) and eight are micro-architectural registers (i.e., registers that store internal state information that is not generally accessible to the programmer). The old destination register tags are then read from the tag future file 328 and written to the tail of the free list. Finally, tag future file 328 is updated by storing tags for the new destination registers.

Memory source operands may be handled by assigning them the same register tag as the destination register. This is because load data will be converted and directly written into the destination register when it is received from load/store unit 26. In the case of an FLD instruction, no further processing is required (except in certain exceptional cases), although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Scheduler 314 may also snoop load data bus. Concurrently with allocating the line of storage and snooping, retire queue 316 allocates one entry for each instruction. The entries store the destination register tags, the absolute destination register number, and the old destination register tags. Additional information may also be included, e.g., information that may be needed to update the architectural state at retire time.

On the cycle following their entry into scheduler 314, the instructions are available for scheduling. Scheduler 314 examines all of the stored instructions and issues the oldest instructions which meet the following criteria: (1) the execution pipeline to which the instruction. has been assigned is available, (2) the result bus for that execution pipeline will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. Each of the three execution pipelines 320, 322, and 326 may accept a new instruction every clock cycle. It is noted that other embodiments capable of scheduling other numbers of instructions concurrently, such as four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding or superforwarding. Result forwarding involves conveying the results from a recently executed instruction directly to other instructions that depend upon that result. Result forwarding allows the result to be used in subsequent instructions without having to wait for the result to be stored in a register and having to read the result from the register. Result superforwarding will be described in more detail below.

Each execution pipeline 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each execution pipeline may begin performing the appropriate computation.

In the embodiment shown in the figure, execution pipeline 320 is configured to perform load and addition operations, execution pipeline 322 is configured to perform load and multiplication operations, and execution pipeline 326 is configured to perform load and store operations. Both execution pipelines 320 and 322 may be configured to perform certain MMX instructions. Execution pipeline 322, which comprises multiplier 50, may also be configured to perform iterative calculations that involve multiplication, e.g., reciprocal operations, division operations, and square root operations, under the control of control unit 354, division/square root ROM 360, and, if a remainder is called for, remainder control unit 356. Constant ROM 358 is a read only memory configured to store a plurality of constants for load constant instructions such as FLDPI, for transcendental computation, for FPU 36 self-checking, and for certain special and exceptional results. Division/square root ROM 360 is a read only memory which stores constants used to determine initial values for division and square root computations and constants returned by certain 3DNow! instructions. Control unit 354 provides sequence information for division and square root functions. Note, in some embodiments control unit 354 may be part of execution and pipeline control unit 340.

In some cases, floating point instruction operands or floating point results generated by executing an instruction may be too small to fit within the operand or result's standard data format. These numbers are referred to as "denormals". While normalized floating-point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within execution pipelines 320, 322, and 326 are tagged when they are generated. Execution and pipeline control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. In some cases, however, store data may be sent to both the load/store unit 26 and register file 318 (e.g., for floating point load control word instructions—FLDCW—and for stores if a denormal is being stored). The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating-point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating-point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating-point units (wherein "x" represents either a one or a zero):

| Sign | Exponent | Significand | Value |
| --- | --- | --- | --- |
| x | $00 \ldots 00_2$ | $0.00 \ldots 00_2$ | Zero |
| x | $11 \ldots 11_2$ | $1.00 \ldots 00_2$ | Infinity |
| x | $11 \ldots 11_2$ | $1.1xx \ldots xx_2$ | QNaN |
| x | $11 \ldots 11_2$ | $1.0xx \ldots xx_2$ | SNaN |
| x | $00 \ldots 00_2$ | $0.xx \ldots xx_2$ | Denormal |

It is noted that these data types may conform to the IEEE-754 specification.

MMX data types are 64 bits wide and comprise either eight packed 8-bit bytes, four packed 16-bit words, or two packed 32-bit double-words. MMX data types may be detected by the MMX opcodes which precede them. Normal data types are standard floating-point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (i.ff . . . ff) of 0.11 . . . 11 is an unsupported value (wherein "i" is an integer bit and wherein "f" is a fractional bit). Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a physical register tag. The physical register tag indicates which data register within register file 318 the corresponding data is to be loaded into.

Execution and pipeline control unit 340 tracks the status of each stage in execution pipelines 320, 322, and 326. Execution and pipeline control unit 340 contains timing information enabling it to determine the future availability of each execution pipelines. For example, when an FMUL (floating-point multiply) instruction begins execution in multiplication execution pipeline 322, control unit 340 uses its stored timing information to notify scheduler 314 that the result will be available for output on result bus 346 four clock cycles later. This timing information allows scheduler 314 to efficiently schedule instruction for execution in execution pipelines 320, 322, and 326. Control unit 340 also tracks the status of each pipe stage, receiving and prioritizing exceptions from execution pipelines 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipeline control unit 340. As a result of instructions executing out of order in FPU 36, exceptions that occur within execution pipelines may need to be stored until the instructions generating them are the next to be retired. Retire queue 316 reads instruction status register file 342 when it retires instructions and updates the architectural floating-point status word (FPSW) and floating-point control word (FPCW) and tag word (collectively, 344) accordingly. This information is conveyed to rename-1 unit along with the current speculative top of stack 352 and on result bus 346.

Figure 3:
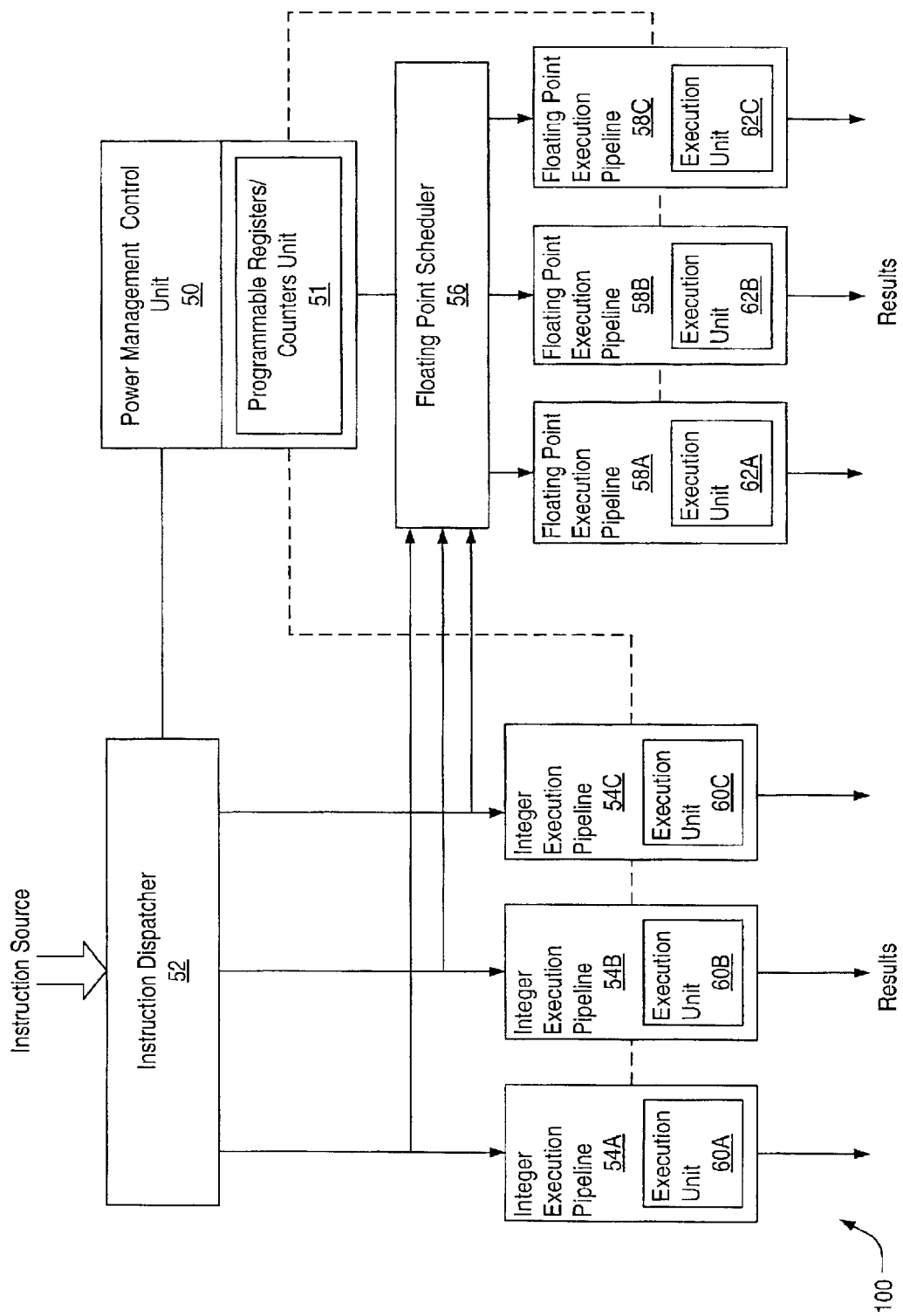
FIG. 3 is a block diagram of one embodiment of functionality of a microprocessor including a power management control unit for throttling performance.

FIG. 3 is a simplified block diagram illustrating aspects of the functionality of a microprocessor 100. It is noted that the specific microprocessor 10 of FIGS. 1 and 2 generally conforms to the functionality illustrated in FIG. 3. Circuit portions that correspond to those of FIGS. 1 and 2 are numbered identically for simplicity and clarity.

The functionality of microprocessor 100 depicted in FIG. 3 includes an instruction dispatcher 52 coupled to a plurality of integer execution pipelines 54A–54C and a floating-point scheduler 56. Power management control unit 50 is coupled to instruction dispatcher 52 and floating-point scheduler 56. A plurality of floating-point execution pipelines 58A–58C are further shown coupled to floating-point scheduler 56. Power management control unit 50 may also be coupled to execution pipelines 54A–54C and 58A–58C as shown in phantom to facilitate control of various performance throttling operations as discussed below.

Each of the integer execution pipelines 54 includes a corresponding execution unit 60A–60C for executing integer instructions, such as those executed by the functional units 24 of FIG. 1 as described previously. Each integer execution pipeline 54 may further include additional functionality, such as the functionality of decode units 20 and reservation stations 22 as illustrated in FIG. 1, although such functionality may not be included in certain embodiments of integer execution pipelines 54.

Instruction dispatcher 52 is configured to dispatch instructions from an instruction source (not shown) to the integer execution pipelines 54. In one embodiment, instruction dispatcher 52 includes the functionality of the instruction alignment unit 18 of FIG. 1. It is noted that in other embodiments, instruction dispatcher 52 may be implemented with alternative mechanisms for dispatching or issuing instructions, such as instruction queues. As used herein, the from "dispatching" is used synonymously with the term "issuing".

Each of the floating-point execution pipelines 58 similarly includes an execution unit 62A–62C, at least one of which is configured to execute floating-point instructions. Floating-point execution pipelines 58A–58C are generally representative of, for example, pipelines 320, 322, and 326 of FIG. 2, although it is noted that in other embodiments, alternative or additional functions (e.g., instructions) may be executed in each of the floating-point execution pipelines 58. For example, in one embodiment each of the floating-point pipelines 58 may be configured to execute any type of floating-point instructions supported by microprocessor 100. It is also noted that in addition to floating-point instructions, each of the floating-point pipelines 58 may also execute other instruction types, such as MMX instructions, as desired.

Floating-point scheduler 56 is coupled to receive instructions dispatched from instruction dispatcher 52 for execution within floating-point execution pipelines 58. In one particular implementation, floating-point scheduler 56 implements the functionality of scheduler 314 of FIG. 2, although other specific forms of schedulers may be employed in other embodiments. It is noted that in yet additional contemplated embodiments, instruction dispatcher 52 may be configured to provide instructions directly to floating-point execution pipelines 58. In such cases, floating-point scheduler 56 may be omitted.

Power management control unit 50 may be configured to implement any one or more of several different techniques for throttling performance of microprocessor 100. In the implementation of a first performance throttling technique, power management control unit 50 may be configured to cause instruction dispatcher 52 to limit the dispatch of fast path instructions to execution units 60. More particularly, the programmable registers/counters unit 51 of power management control unit 50 may be programmed through software such that instruction dispatcher 52, rather than dispatching instructions at the normal maximum dispatch rate of three instructions per cycle (in this particular embodiment), dispatches instructions at a rate of only two instructions per cycle or at a rate of only one instruction per cycle, depending upon a value stored within programmable registers/counters unit 51. Thus, when operating in this mode, only one or two of the execution units 54 (depending upon the stored value) will be active. For example, in one implementation, when a particular value stored within programmable registers/counters unit 51 of power management control unit 50, instruction dispatcher 52 dispatches instructions only to instruction execution pipeline 54A for execution by execution unit 60A. Likewise, when a second particular value is stored within programmable registers/counters unit 51, power management control unit 50 causes instruction dispatcher 52 to dispatch instructions only to integer execution pipelines 54A and 54B for execution by execution unit 60A and 60B. In one implementation, invalid signals (or invalid bits) are provided to the execution pipelines for which no instruction is dispatched by instruction dispatcher 52. When an invalid signal (or an invalid bit associated with an instruction bus) is conveyed from instruction dispatcher 52 to a particular execution pipeline 54, the execution pipeline may be configured to not respond to the input from instruction dispatcher 52 during that cycle by, for example, preventing input latches or flip-flops associated with the input of the pipeline from receiving a new value during that cycle. This thereby reduces transient power losses and overall power consumption.

In the implementation of a second performance throttling technique, power management control unit 50 may be configured to limit the dispatch of instructions from instruction dispatcher 52 to integer execution pipelines 54 and/or floating-point scheduler 56 on every cycle, upon every other cycle, upon every third cycle, upon every fourth cycle, and so on. In one particular implementation, a counter (or counters) associated programmable registers/counters unit 51 may be set with an initial count value which is decremented upon each cycle of the microprocessor until it reaches a value of, for example, "0", and then resets to the initial count value to resume a similar count cycle. Instruction dispatcher 52 may be configured to dispatch instructions to integer execution pipeline 54 and/or floating-point scheduler 56 only when the counter reaches a particular value (or values). Thus, for example, if an initial count value of "2" is stored in a designated counter of programmable register/counter unit 51, power management control unit 50 may be configured to decrement the value from "2" to "1" to "0" and then back to a value of "2" upon successive clock cycles of microprocessor 100. Power management control unit 50 may cause instruction dispatcher 52 to dispatch instructions only upon cycles where a value of "0" is contained in the corresponding counter, thus resulting in a valid instruction to be dispatched to integer execution pipelines 54 and/or floating-point scheduler 56 upon every third clock cycle. Other particular implementations of this functionality are contemplated and possible.

In the implementation of a third performance throttling technique, power management control unit 50 may be configured in a similar fashion to control the dispatch of instructions to the floating-point execution pipelines 58. In this manner, performance of the floating-point portion of microprocessor 100 may be throttled or limited, thereby conserving power, without affecting performance of the integer functionality of the processor implemented by integer execution pipelines 54. In one particular embodiment, a separate counter (such as a 3 bit counter) is provided within programmable registers/counters unit 51 that corresponds to each floating-point execution unit 62 (or to each floating-point execution pipeline 58). Each counter can be set to an independent value. The value in each counter is used by power management control unit 50 to separately control the issuance of instructions from schedule 56 to each of the respective floating-point execution units 62. In this manner, valid instructions may be provided to each respective floating-point execution unit 62 on every cycle, every other cycle, every third cycle, every fourth cycle, and so on, to achieve desired power conservation.

In yet additional embodiments, power management control unit 50 may alternatively or additionally throttle the performance of other processors subunits to reduce power on either a maximum power or average power basis. For example, in one embodiment, power management control unit 50 may be configured to cause instruction cache 16 and/or data cache 28 (of FIG. 1) to process requests only on every other cycle, every third cycle, etc. Other subunits of the microprocessor may similarly be controlled by power management control unit 50.

Figure 4:
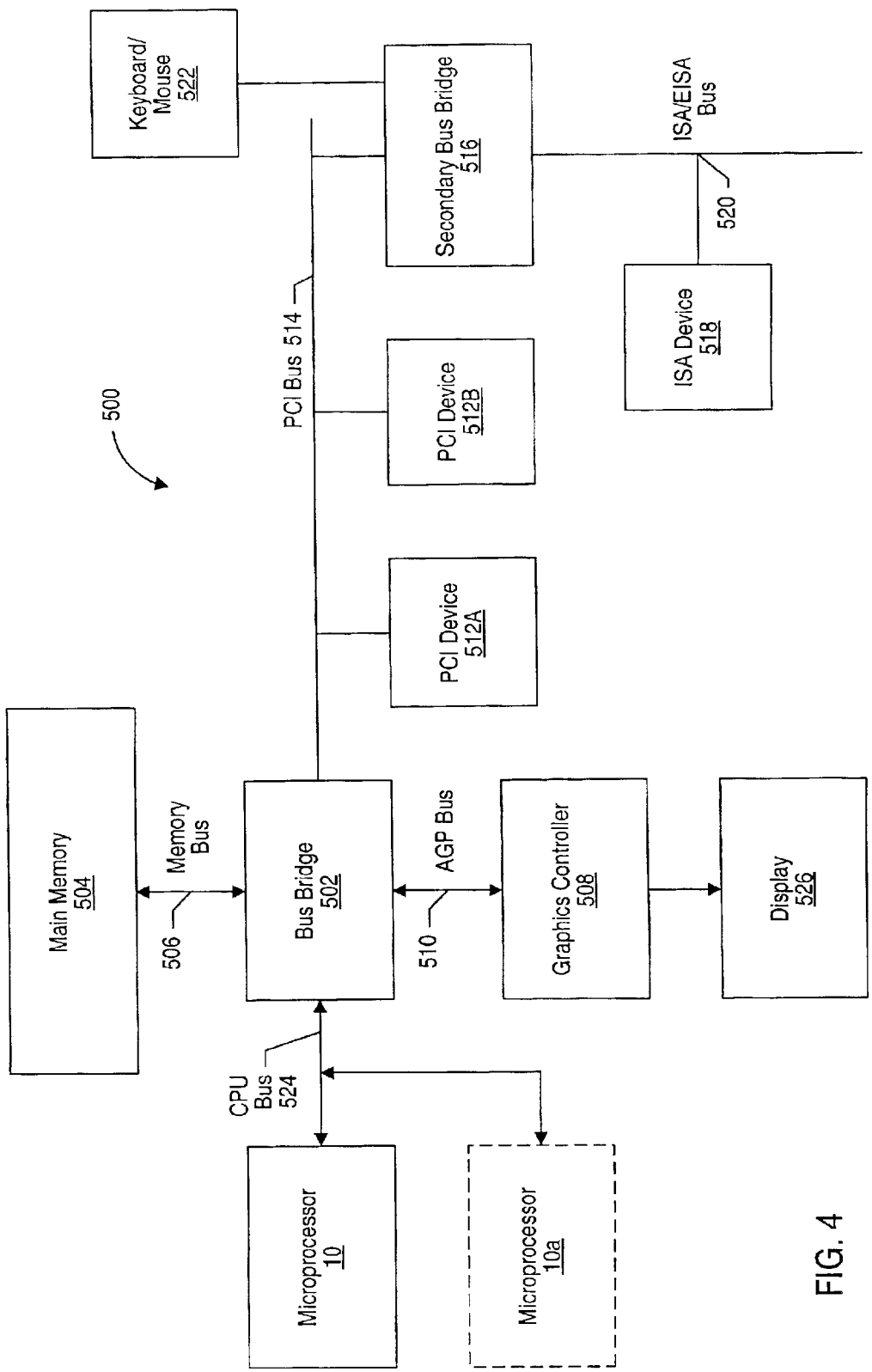
FIG. 4 is a block diagram of one embodiment of a computer system configured to utilize the microprocessor of FIG. 1.

Turning finally to FIG. 4, a block diagram of one embodiment of a computer system 500 configured to utilize one embodiment microprocessor 10 including power management control unit 50 is shown. Microprocessor 10 is coupled to a variety of system components through a bus bridge 502. Other embodiments are possible and contemplated. In the depicted system, a main memory 504 is coupled to bus bridge 502 through a memory bus 506, and a graphics controller 508 is coupled to bus bridge 502 through an AGP bus 510. Finally, a plurality of PCI devices 512A–512B are coupled to bus bridge 502 through a PCI bus 514. A secondary bus bridge 516 may further be provided to accommodate an electrical interface to one or more EISA or ISA devices 518 through an EISA/ISA bus 520. Microprocessor 10 is coupled to bus bridge 502 through a CPU bus 524.

Bus bridge 502 provides an interface between microprocessor 10, main memory 504, graphics controller 508, and devices attached to PCI bus 514. When an operation is received from one of the devices connected to bus bridge 502, bus bridge 502 identifies the target of the operation (e.g. a particular device or, in the case of PCI bus 514, that the target is on PCI bus 514). Bus bridge 502 routes the operation to the targeted device. Bus bridge 502 generally translates an operation from the protocol used by the source device or bus to the protocol used by the target device or bus.

In addition to providing an interface to an ISA/EISA bus for PCI bus 514, secondary bus bridge 516 may further incorporate additional functionality, as desired. For example, in one embodiment, secondary bus bridge 516 includes a master PCI arbiter (not shown) for arbitrating ownership of PCI bus 514. An input/output controller (not shown), either external from or integrated with secondary bus bridge 516, may also be included within computer system 500 to provide operational support for a keyboard and mouse 522 and for various serial and parallel ports, as desired. An external cache unit (not shown) may further be coupled to CPU bus 524 between microprocessor 10 and bus bridge 502 in other embodiments. Alternatively, the external cache may be coupled to bus bridge 502 and cache control logic for the external cache may be integrated into bus bridge 502.

Main memory 504 is a memory in which application programs are stored and from which microprocessor 10 primarily executes. A suitable main memory 504 comprises DRAM (Dynamic Random Access Memory), and preferably a plurality of banks of SDRAM (Synchronous DRAM).

PCI devices 512A–512B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 518 is illustrative of various types of peripheral devices, such as a modem, a sound card, and a variety of data acquisition cards such as GPIB or field bus interface cards.

Graphics controller 508 is provided to control the rendering of text and images on a display 526. Graphics controller 508 may embody a typical graphics accelerator generally known in the art to render three dimensional data structures which can be effectively shifted into and from main memory 504. Graphics controller 508 may therefore be a master of AGP bus 510 in that it can request and receive access to a target interface within bus bridge 502 to thereby obtain access to main memory 504. A dedicated graphics bus accommodates rapid retrieval of data from main memory 504. For certain operations, graphics controller 508 may further be configured to generate PCI protocol transactions on AGP bus 510. The AGP interface of bus bridge 502 may thus include functionality to support both AGP protocol transactions as well as PCI protocol target and initiator transactions. Display 526 is any electronic display upon which an image or text can be presented. A suitable display 526 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 500 may be a multiprocessing computer system including additional microprocessors (e.g. microprocessor 10a shown as an optional component of computer system 500). Microprocessor 10a may be similar to microprocessor 10. More particularly, microprocessor 10a may be an identical copy of microprocessor 10. Microprocessor 10a may share CPU bus 524 with microprocessor 10 or may be connected to bus bridge 502 via an independent bus.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A microprocessor comprising:
   a plurality of execution units each configured to execute instructions;
   an instruction dispatch circuit configured to dispatch said instructions for execution by said plurality of execution units;
   a power management control unit coupled to said instruction dispatch circuit, wherein said power management unit includes a programmable unit for storing a particular value specifying a reduced power mode;
   wherein said instruction dispatch circuit is configured to convey instructions to a restricted number of said plurality of execution units in response to said particular value being stored in said programmable unit;
   a floating-point scheduler coupled to receive floating-point instructions dispatched from said instruction dispatcher;
   at least one floating-point execution pipeline coupled to receive said floating-point instructions from said floating-point scheduler;
   wherein said power management control unit is further configured to be programmed in a floating-point power reduced mode, wherein said floating-point scheduler is configured to stall dispatch of selected floating-point instructions to said at least one floating-point execution pipeline in response to said reduced floating-point power mode.

2. A microprocessor as recited in claim 1 wherein said instruction dispatch circuit comprises an instruction alignment unit.

3. The microprocessor as recited in claim 1 wherein each of said plurality of execution units is configured to execute integer instructions.

4. The microprocessor as recited in claim 1 wherein each of said plurality of execution units is included within a corresponding execution pipeline.

5. The microprocessor as recited in claim 4 wherein each corresponding execution pipeline includes a decode unit coupled to receive instructions from said instruction dispatch circuit and a reservation station coupled to receive a decoded instruction from said decoder.

6. The microprocessor as recited in claim 1 wherein said power management control unit is configured to cause said floating-point scheduler to stall dispatch of selected floating-point instructions to said at least one floating-point execution pipeline during selected cycles.

7. A microprocessor comprising:
   at least one execution unit configured to execute instructions;
   an instruction dispatch circuit configured to dispatch said instructions for execution by said at least one execution unit;
   a power management control unit coupled to said instruction dispatch circuit, wherein said power management unit includes a programmable unit for storing information corresponding to a reduced power mode;
   wherein said instruction dispatch circuit is configured to stall dispatch of selected instructions to said at least one execution unit upon certain dispatch cycles in response to said information being stored in said programmable unit;
   a floating-point scheduler coupled to receive floating-point instructions dispatched from said instruction dispatcher;
   at least one floating-point execution pipeline coupled to receive said floating-point instructions from said floating-point scheduler;
   wherein said power management control unit is further configured to be programmed in a floating-point power reduced mode, wherein said floating-point scheduler is configured to stall dispatch of selected floating-point instructions to said at least one floating-point execution pipeline in response to said reduced floating-point power mode.

8. The microprocessor as recited in claim 7 wherein said at least one execution unit includes at least two execution units coupled in a parallel, superscalar configuration.

9. The microprocessor as recited in claim 7 wherein said programmable unit includes a counter containing a value that is modified upon each dispatch cycle, wherein a particular value of said counter controls the stall of said selected instructions.

10. A microprocessor as recited in claim 7 wherein said instruction dispatch circuit comprises an instruction alignment unit.

11. The microprocessor as recited in claim 7 wherein each of said plurality of execution units is configured to execute integer instructions.

12. The microprocessor as recited in claim 7 wherein each of said plurality of execution units is included within a corresponding execution pipeline.

13. The microprocessor as recited in claim 12 wherein each corresponding execution pipeline includes a decode unit coupled to receive instructions from said instruction dispatch circuit and a reservation station coupled to receive a decoded instruction from said decoder.

14. The microprocessor as recited in claim 7 wherein said power management control unit is configured to cause said floating-point scheduler to stall dispatch of said selected floating-point instructions to said at least one floating-point execution pipeline during selected cycles.

* * * * *